United States Patent
Goto et al.

(10) Patent No.: US 6,373,224 B1
(45) Date of Patent: *Apr. 16, 2002

(54) BATTERY ACCUMULATING APPARATUS

(75) Inventors: Masayoshi Goto; Toshio Gohnai, both of Tokyo (JP)

(73) Assignee: Mitsubishi Denki Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/443,286

(22) Filed: Nov. 19, 1999

(30) Foreign Application Priority Data

Jun. 4, 1999 (JP) .......................... 11-157797

(51) Int. Cl.[7] .................. H02J 7/04; H01M 10/44
(52) U.S. Cl. .............. 320/119; 320/125; 320/101; 320/160; 320/162
(58) Field of Search ................. 320/119, 116, 320/122, 125, 101, 160, 162

(56) References Cited

U.S. PATENT DOCUMENTS

| | | | | |
|---|---|---|---|---|
| 5,367,244 A | * | 11/1994 | Rose et al. ............... | 320/141 |
| 5,387,857 A | * | 2/1995 | Honda et al. ............ | 320/119 |
| 5,530,335 A | * | 6/1996 | Decker et al. ........... | 320/106 |
| 5,804,944 A | | 9/1998 | Alberkrack et al. | |
| 5,808,442 A | | 9/1998 | Kaite et al. | |
| 5,818,201 A | * | 10/1998 | Stockstad et al. ...... | 320/119 |
| 6,034,506 A | * | 3/2000 | Hall ........................ | 320/117 |

FOREIGN PATENT DOCUMENTS

| | | |
|---|---|---|
| JP | 53-15539 | 2/1978 |
| JP | 55-83172 | 6/1980 |
| JP | 59-72941 | 4/1984 |
| JP | 6-133465 | 5/1994 |
| JP | 6-165399 | 6/1994 |
| JP | WO 95/20247 | 7/1995 |
| JP | 7-230829 | 8/1995 |
| JP | 8-508609 | 9/1996 |
| JP | 9-121462 | 5/1997 |
| JP | 9-308126 | 11/1997 |
| JP | 10-4636 | 1/1998 |
| JP | 10-145979 | 5/1998 |
| JP | 10-248177 | 9/1998 |
| JP | 11-89106 | 3/1999 |
| JP | 2000-236631 | 8/2000 |

* cited by examiner

*Primary Examiner*—Gregory Toatley
(74) *Attorney, Agent, or Firm*—Burns, Doane, Swecker & Mathis, LLP

(57) ABSTRACT

In a battery accumulating apparatus, a charge current I1 from the charging solar battery 9 is supplied to the storage battery 5 through the switch 10, and charges the storage battery 5. The charge controller 4b detects each cell voltage of the storage battery 5, and when any cell voltage reaches a prescribed value, the charge controller 4b turns the switch 10 which is in the ON status to the OFF status. The charge controller 4b has a function which generates the charge currents I2 and I3 (I2>I3) whose levels are lower than the charge current I1, according to the output from the charging solar battery 9, and which supplies the charge current I2 to the storage battery 5 to charge the battery at the same time as the turning OFF of the switch 10. The storage battery 5 is charged by the charge current I2, and when any cell voltage reaches a prescribed value, the charge controller 4b switches the charge current I2 to the charge current I3, and supplies the charge current I3 to the storage battery 5.

11 Claims, 7 Drawing Sheets

BATTERY ACCUMULATING APPARATUS

This application claims priority under 35 U.S.C. §§119 and/or 365 to filed on the entire content of which is hereby incorporated by reference.

BACKGROUND OF THE INVENTION

1. Field of the Invention

The present invention relates to a battery accumulating apparatus for use in a low altitude satellite use power supply apparatus, an electric motorcar use power supply apparatus, or the like.

In this connection, herein, for the convenience of explanation, a low altitude satellite use power supply apparatus will be described.

2. Description of the Related Art

FIG. 6 is a structural view of the low altitude satellite use power supply apparatus using a conventional storage battery such as a Ni—Cd (Nickel Cadmium) battery. In FIG. 6, numeral 1 is a solar battery, numeral 2 is a shunt apparatus to consume surplus power generated in the solar battery, and numeral 3 is a power controller into which a current from the solar battery 1 is input through the shunt apparatus 2, and which supplies a current to a charging controller 4a and a load 6, and when the generated power of the solar battery 1 is lowered, which controls the charge controller 4a so that the current is supplied to the load 6 by discharging the storage battery 5. The charge controller 4a is a charge controller which receives an output from the power controller 3 and supplies a current to the storage battery 5 for charging, and discharges the storage battery 5 by a signal output when the generated power of the solar battery 1 is low. Numeral 7 is a reverse-current prevention diode.

The operation of the conventional low altitude satellite use power supply apparatus will be described below.

A current from a solar battery 1 is input into a power controller 3 through a reverse-current prevention diode 7 and a shunt apparatus 2. The power controller 3 supplies the current obtained from the solar battery 1 in shining hours to a load 6 and a charge controller 4a. The charge controller 4a generates a prescribed value of current IO shown in FIG. 7C by power from the power controller 3, supplies the current IO to a storage battery 5, and charges the storage battery 5. The voltage of the storage battery 5 increases as shown in FIG. 7B as the charging process advances. When the charge controller 4a detects that the voltage of the storage battery 5 reaches a predetermined temperature-compensated voltage value as shown in FIG. 7A (this is called V-T curve, in which 1-n lines are set by request), a charging mode of the charge controller 4 shifts from constant-current charging till then to constant-voltage charging. According to this, the charge current decreases taperingly as shown in FIG. 7C, and prevents over-charge to the storage battery 5.

On the other hand, in the time of shade, when the generated power of the solar battery 1 decreases, the charge controller 4a discharges the storage battery 5 by the output of the power controller 3, and supplies the power to the load 6.

The charge of the storage battery in the conventional low altitude satellite use power supply apparatus is performed as described above, however, the constant-voltage/constant-current charge as described above is conducted on the overall storage battery in which n battery cells are cascade-connected in series, therefore, there is a problem that a specific cell in the storage battery is overcharged due to the unbalance in charge characteristics of each cell constituting the storage battery. Specifically, in the Li-Ion (Lithium Ion) cell structured by Li (Lithium) electrode, energy density, charging voltage, discharging voltage, etc., are higher as compared to those of a Ni—Cd cell, and the Li-Ion cell is expected for use in the storage battery, however, in the case of the Li-Ion cell, there is a problem that electrode deterioration is accelerated and the life is shortened when voltage of the cell exceeds a rated voltage and the cell is in the overcharged condition. For example, as the constant-voltage operating voltage in the V-T curve at the temperature of 0° C., the sum of n cell voltage is detected as the storage battery voltage, and compared to the setting voltage, however, when m-th cell voltage is higher than that of the other cells due to the internal resistance of the cell, the voltage exceeds the upper limit of the cell voltage, sometimes resulting in deterioration of the cell.

SUMMARY OF THE INVENTION

The present invention is achieved to solve the above-identified problem and the object of the present invention is to obtain the battery accumulating apparatus by which an appropriate charge amount can be secured without overcharging each cell constituting the storage battery.

A battery accumulating apparatus of the first invention comprises a storage battery to which battery cells are cascade-connected, and a charge current generating means having a means which generates a plurality of different charge currents to charge the storage battery from the power supply output, and supplies the plurality of different charge currents to the storage battery.

In a battery accumulating apparatus of the second invention, in the first invention, the charge current generating means is provided with a means for generating a plurality of different charge currents, and for changing the charge current so as to be supplied at a low level after, initially, the charge current is supplied at a high level.

In a battery accumulating apparatus of the third invention, the charge current generating means is provided with a means for changing the charge current from a high level to a low level when any of voltage of battery cells reaches a prescribed value.

In a battery accumulating apparatus of the fourth invention, a shunt circuit is respectively connected to each battery cell, and when any of voltage battery cells reaches a prescribed value under the lowest level charge current supply condition to the storage battery, the charge current flowing to the battery cell is bypassed to the shunt circuit connected to the battery cell.

In a battery accumulating apparatus of the fifth invention, a switch is provided between the power supply and the storage battery, and normally is turned OFF, when in the ON status by the charge current generating means when any of voltage of battery cells reaches a prescribed value; and is returned to ON by discharge of the battery cells.

In a battery accumulating apparatus of the sixth invention, the charge current generating means is provided with a means which detects the voltage of the overall battery cell, and which shifts to constant-voltage charge control when the detected voltage reaches a prescribed value.

In a battery accumulating apparatus of the seventh invention, the charge current generating means is provided with a means which releases the constant-voltage charge control when the voltage of the plurality of battery cells becomes unbalanced, and charges the battery cells by the low level charge current until the voltage of the battery cells reaches a prescribed value.

In a battery accumulating apparatus of the eighth invention, a Li-Ion (lithium ion) battery cell structured by a Li (lithium) electrode is used as the battery cell.

DETAILED DESCRIPTION OF THE PREFERRED EMBODIMENTS

Now, a description will be given in more detail of preferred embodiments of the invention with reference to the accompanying drawings.

(Embodiment 1)

Figure 1:
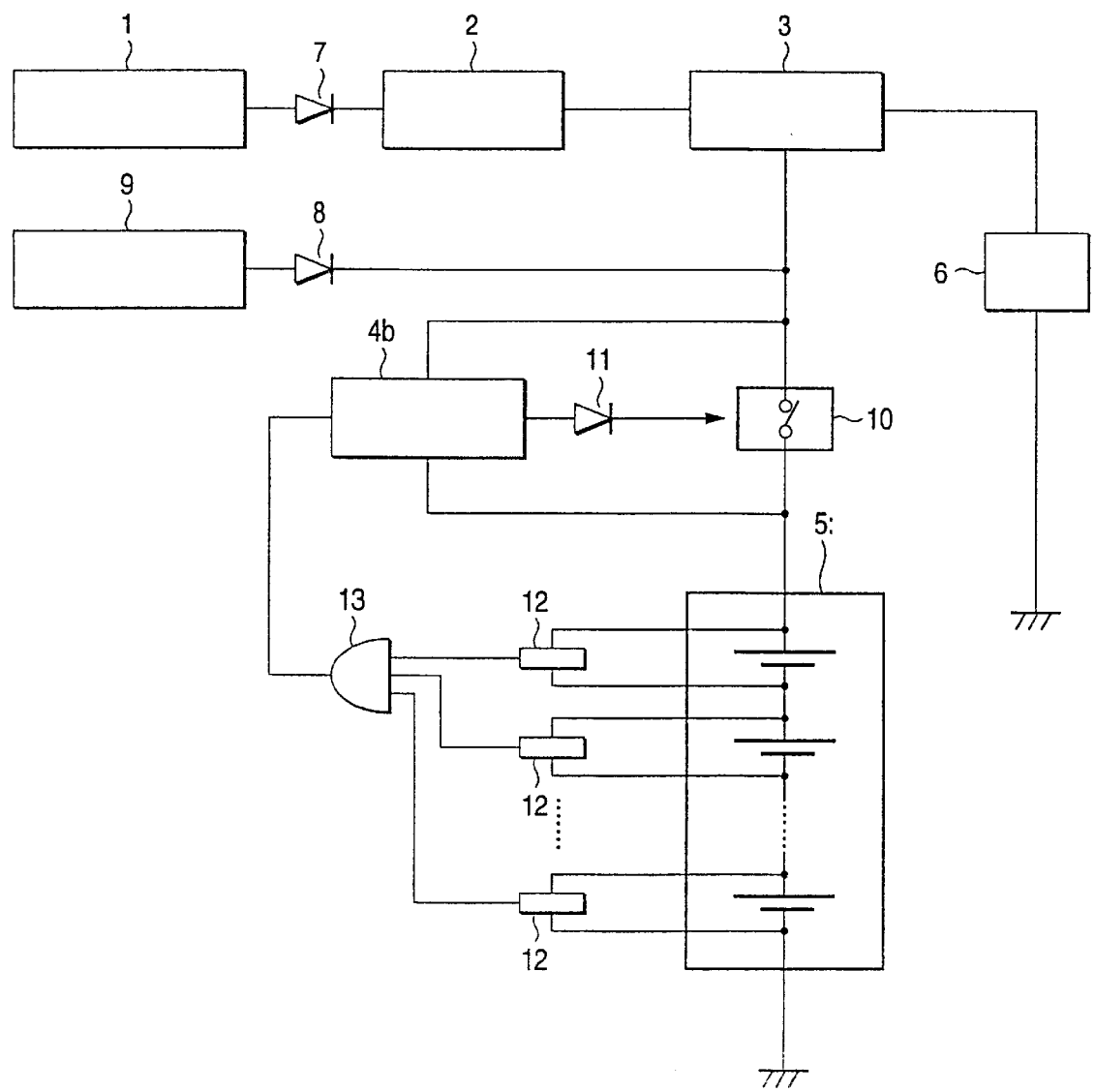
FIG. 1 is a structural view of a low altitude satellite use power supply apparatus showing Embodiment 1 of the present invention.
Figure 6:
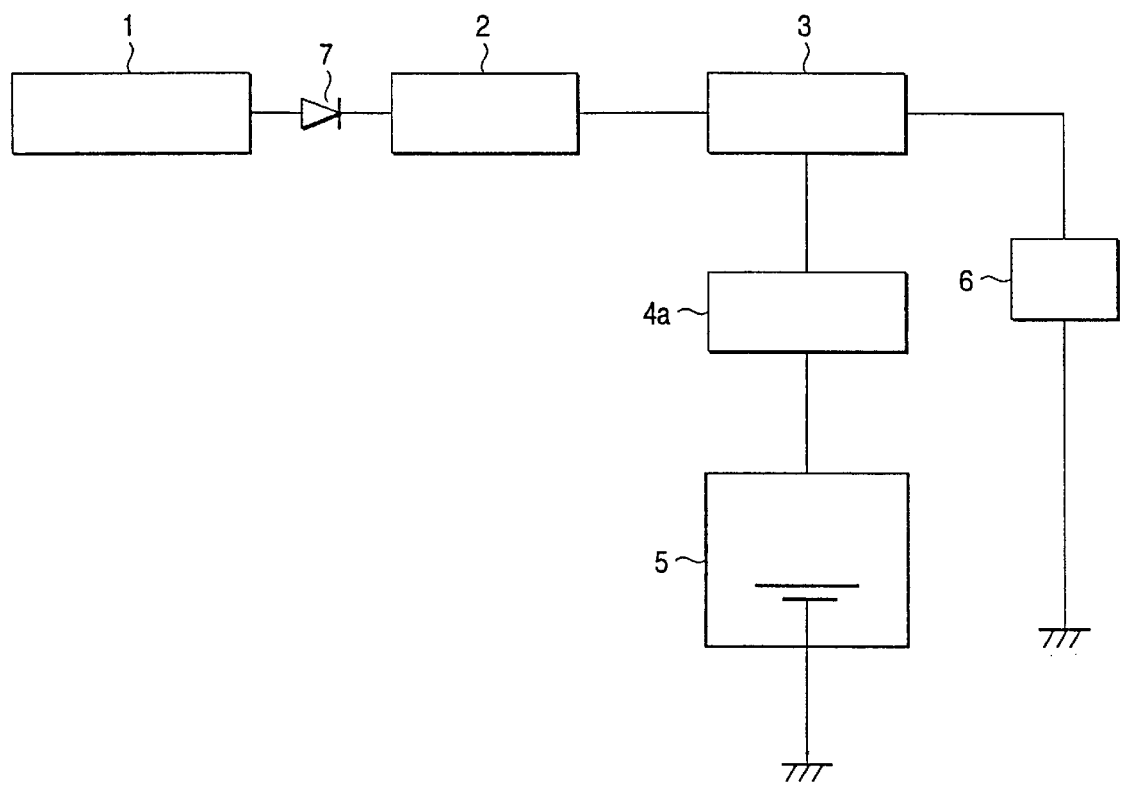
FIG. 6 is a structural view of the conventional low altitude satellite use power supply apparatus.
Figure 7A:
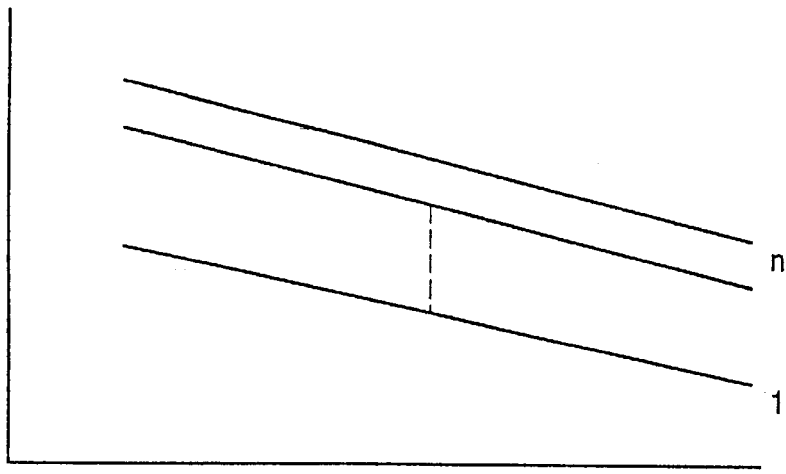
FIGS. 7A to 7C are graphs for explaining the current and voltage characteristics of the conventional low altitude satellite use power supply apparatus.
Figure 7B:
Figure 7C:
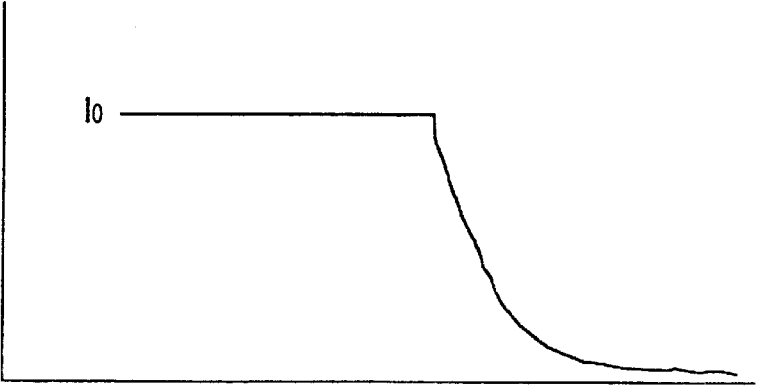

FIG. 1 is a structural view of a low altitude satellite use power supply apparatus showing Embodiment 1 of the present invention. In FIG. 1, numerals 1, 2, 3, 5, 6 and 7 are the same as those in FIG. 6. Numeral 4b is a charge controller to generate a plurality of charge currents according to the output of a charging solar battery 9, and to supply a plurality of different charge currents to a storage battery to which battery cells are cascade-connected; numeral 8 is a reverse-flow prevention diode connected between the charging solar battery 9 and the storage battery 5; and numeral 10 is a switch connected between the storage battery 5 and the reverse-flow prevention diode 8. The switch has an ON status when charging is started, and therefore charging is directly conducted from the charging solar battery 9 to the storage battery 5. Numeral 11 is a control diode.

In this connection, the charge controller 4b has a current control section to generate charge currents I2 and I3 (I2>I3) whose levels are lower than a charge current I1 according to the output of the charging solar battery 9.

Numeral 12 is a plurality of cell voltage detectors to detect voltage of each battery cell, and to output a predetermined signal when the detected voltage of the battery cell reaches a prescribed value, and numeral 13 is an OR circuit which is connected to output terminals of the plurality of cell voltage detectors 12, and outputs a predetermined signal from the cell voltage detectors 12 to the charge controller 4b.

Next, operations of the present invention will be described below.

Figure 2A:
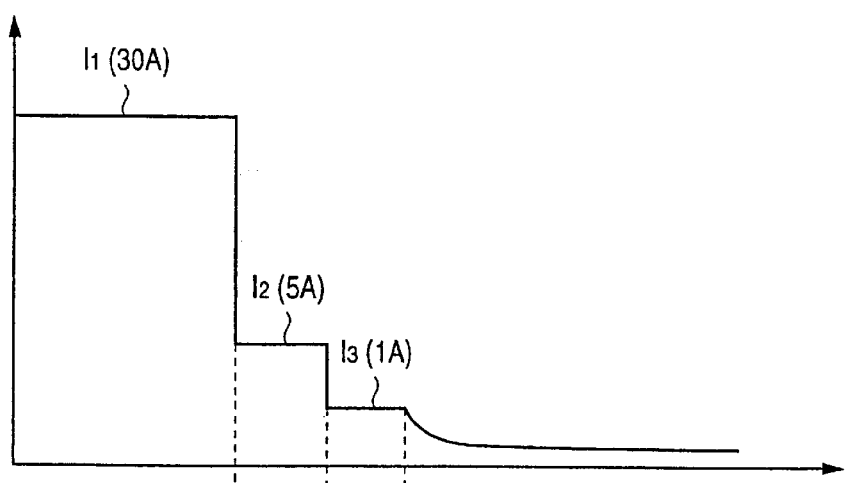
FIGS. 2A and 2B are graphs for explaining the current and voltage characteristics of the low altitude satellite use power supply apparatus showing Embodiment 1 of the present invention.
Figure 2B:
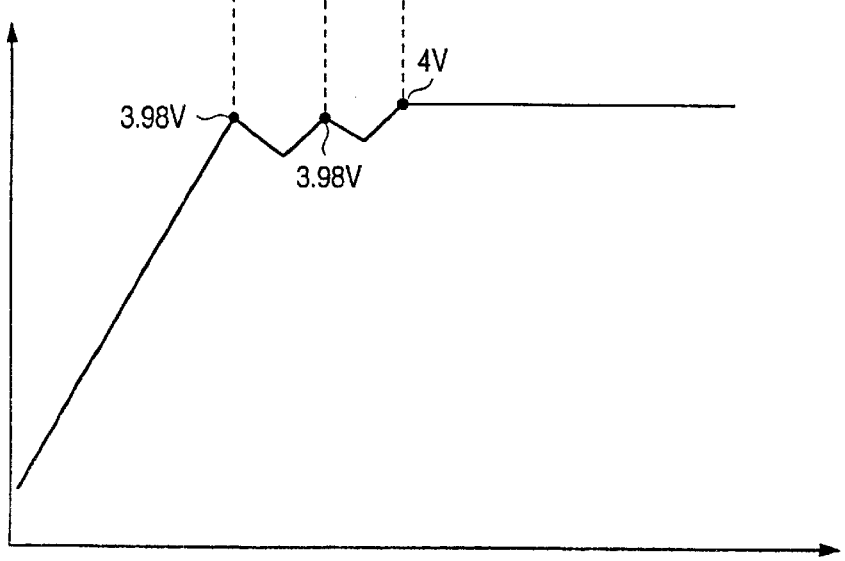

When the charge current I1 (for example, 30 A) from the charging solar battery 9 is supplied to the storage battery 5 through the switch 10 as shown by I1 in FIG. 2A, each battery cell of the storage battery 5 is charged, and voltage of each battery cell increases as shown by A in FIG. 2B. The cell voltage detector 12 respectively detects voltage of the battery cell, and when any cell voltage of the plurality of battery cells reaches a prescribed value (for example, 3.98 V), the cell voltage detector 12 which detects the cell voltage, outputs a High level signal, for example, to the OR circuit 13. When the High level signal output from the cell voltage detector 12 is input through the OR circuit 13, the charge controller 4b outputs a signal through the control diode 11 to switch the switch 10, which is in the ON status, to the OFF status. Further, the charge controller 4b turns the switch 10 OFF when the overall voltage of the battery cells reaches a prescribed value (for example, 3.95 V× the number of battery cells), and shifts the charging mode to the constant-voltage charge.

Further, the charge controller 4b has a function to generate the charge currents I2 and I3 (I2>I3) whose levels are lower than the charge current I1, according to the output from the charging solar buttery 9 (a function by which the charge current I1 is switched to the charge currents I2 and I3), and supplies the charge current I2 (refer to I2 in FIG. 2A), for example, 5A to the storage battery 5 at the same time as the turning OFF of the switch 10, and charges each battery cell. At this time, the charge voltage of each battery cell initially decreases as shown by B in FIG. 2B, and in a short time, it increases. Each battery cell is charged by the charge current I2 and when any cell voltage of the plurality of battery cells reaches a prescribed value (for example, 3.98 V), the voltage is detected by the cell voltage detector 12, and the detection signal is input into the charge controller 4b through the OR circuit 13. The charge controller 4b receives the signal from the cell voltage detector 12, and switches the charge current I2 to I3 and supplies the charge current I3 (for example, 1 A) shown in FIG. 2A to the storage battery 5, and charges each battery cell (refer to C in FIG. 2B).

In this connection, the charge controller 4b outputs a signal to the switch 10 through the control diode 11; to return the switch 10 to the ON status at the time of discharge of the storage battery 5.

As described above, the present invention is provided with a multi-stage charge function which supplies the plurality of different charge currents to the storage battery, and after supplying the charge current initially at a high level, next supplies the charge current at low level, and therefore, the charge controller may control the charge current whose level is lower than the power of the charging solar battery, therefore, there are effects that the charging efficiency is increased and the size and weight can be reduced.

Further, when the lower level charge current is set, the charge control can be more precisely conducted.

(Embodiment 2)

Figure 3:
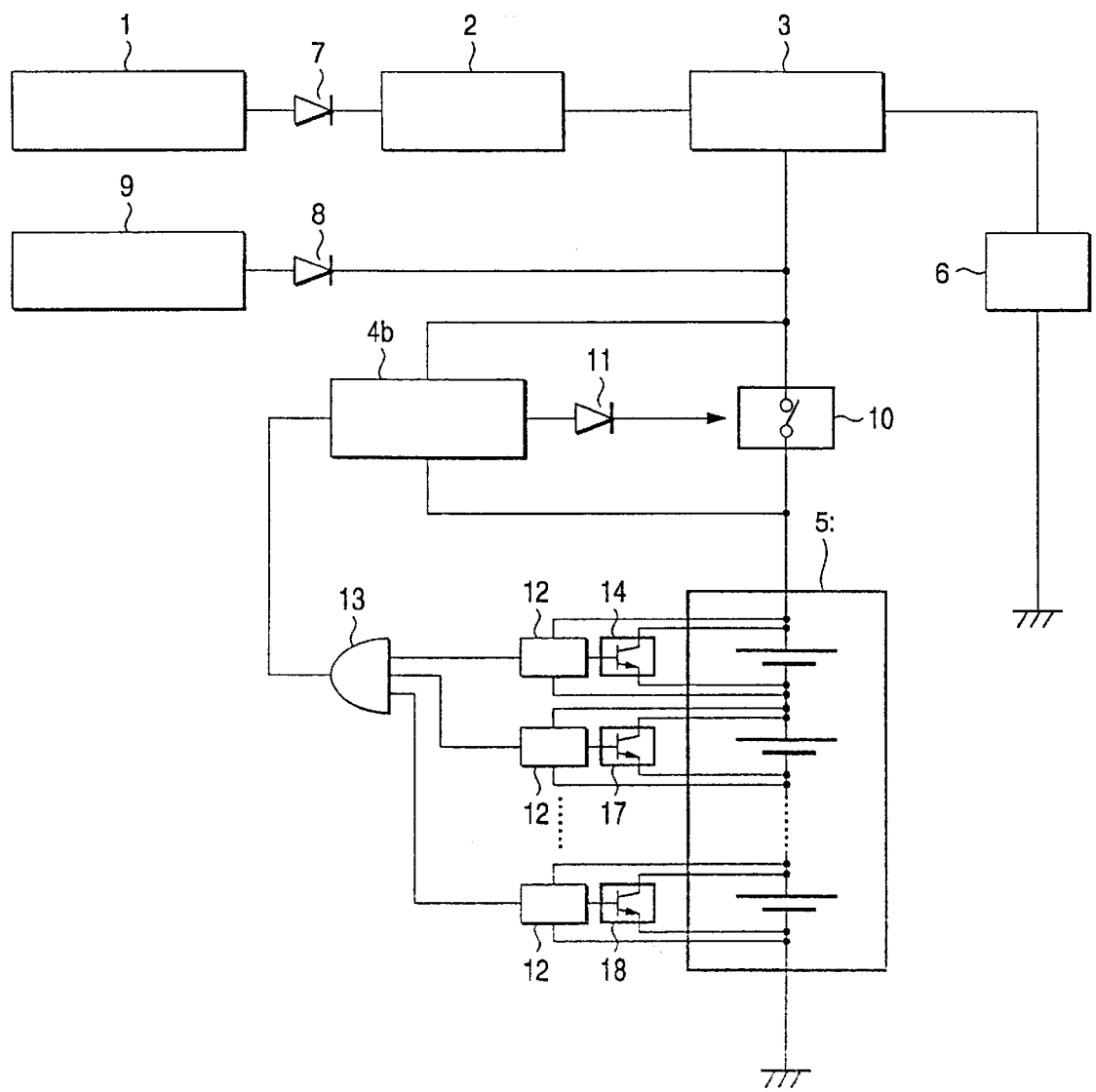
FIG. 3 is a structural view of the low altitude satellite use power supply apparatus showing Embodiment 2 of the present invention.

FIG. 3 is a structural view of the low altitude satellite use power supply apparatus showing Embodiment 2 of the present invention. Embodiment 2 is characterized in that the shunt circuit 14 is connected in parallel to each battery cell in the structure of Embodiment 2, and when the voltage of the battery cell reaches a prescribed value, the charge current is bypassed by the shunt circuit 14 being connected in parallel to the battery cell whose voltage reaches the prescribed value so that the voltage increase of the battery cell is suppressed. When the battery cell is charged by the charge current I3, the cell voltage detector 12 outputs a Low level signal when the voltage of the battery cell does not reach a prescribed value. The shunt circuit 14 is in OFF status when the Low level signal is output, and the charge current I3 flows into the battery cell. On the other hand, the cell voltage detector 12 outputs a High level signal when the voltage of the battery cell reaches the prescribed value. The shunt circuit 14 is turned to ON status by this High level signal. According to that, the charge current is bypassed by the shunt circuit 14 which is connected in parallel to the battery cell whose voltage reaches the prescribed value and consumed, thereby, the charge current I3 does not flow to that battery cell, and the voltage increase can be suppressed.

As described above, the present invention can control the upper limit voltage for each battery cell, and cycle life deterioration of the battery cell can be suppressed to the minimum.

(Embodiment 3)

Figure 4:
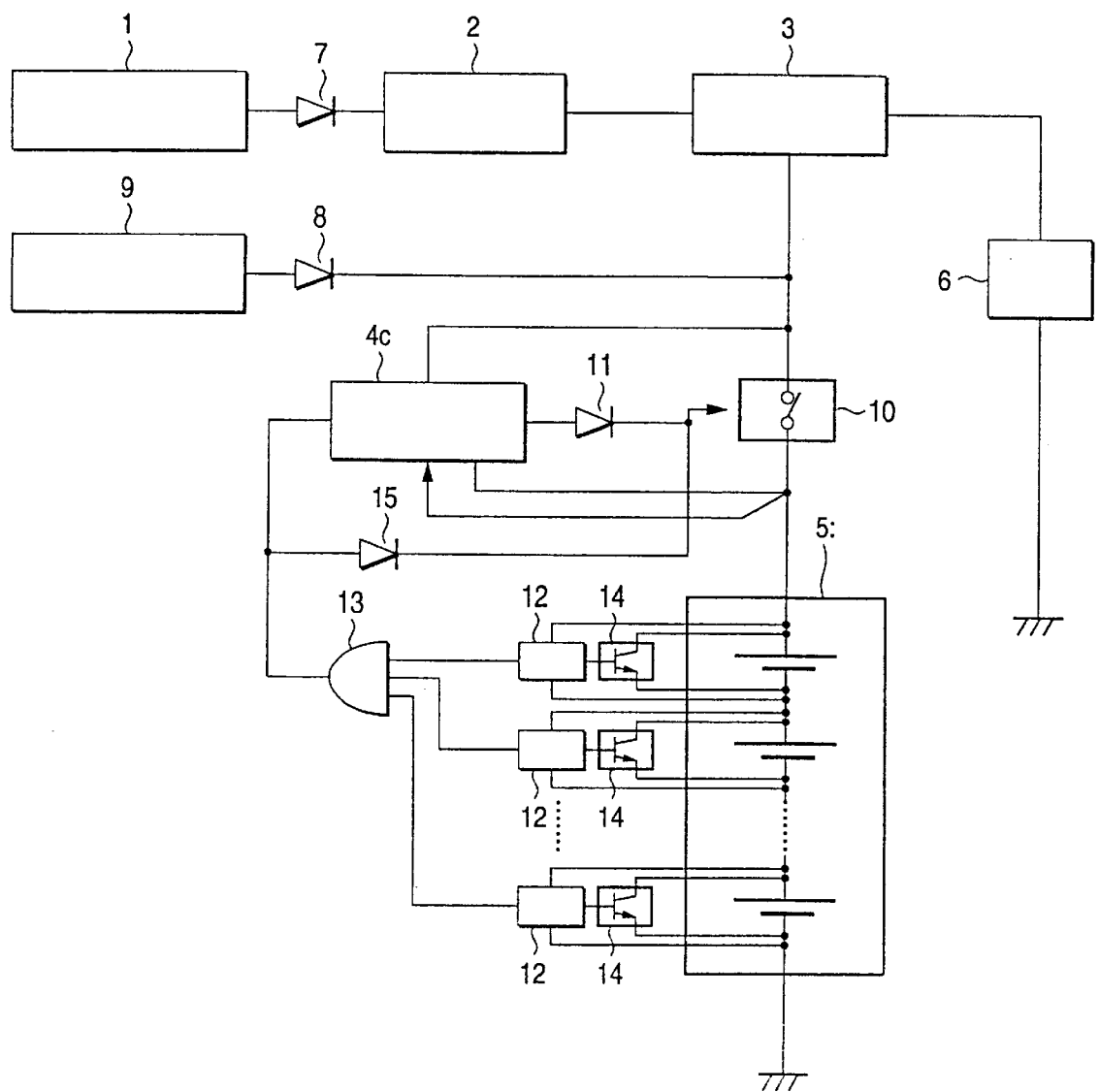
FIG. 4 is a structural view of the low altitude satellite use power supply apparatus showing Embodiment 3 of the present invention.

FIG. 4 is a structural view of the low altitude satellite use power supply apparatus showing Embodiment 3 of the present invention. Embodiment 3 is basically the same as Embodiment 2, however, the different points from Embodiment 2 are as follows: a signal diode 15 is provided to output a signal to turn OFF the switch 10 according to the output of the OR circuit 13, and a charge controller 4c is provided having a function in which, when the storage battery is charged by the charge current I3, the voltage of the overall battery is monitored, and when the voltage reaches a prescribed value (which is set lower than the predetermined voltage to switch the charge current), the constant-current charge is shifted (switched) to the constant-voltage charge.

In this connection, the constant-voltage charge is carried out when the voltage of each battery cell is balanced, and is an ideal condition as a battery operation.

As described above, in the present invention, the charge controller is provided with a function which monitors the voltage of the overall storage battery when the storage battery is charged by the charge current I1, and which switches the charging mode from the constant-current charge to the constant-voltage charge when the voltage reaches a prescribed value (for example, 3.95 V× the number of batteries), and by using both this function and the multi-stage charge together, when voltage characteristics of the battery cell are balanced, the charge control is conducted without operating the shunt circuit as much as possible, thereby, the predetermined voltage can be suppressed low, and the cycle life deterioration of the battery cell can be suppressed low.

(Embodiment 4)

Figure 5:
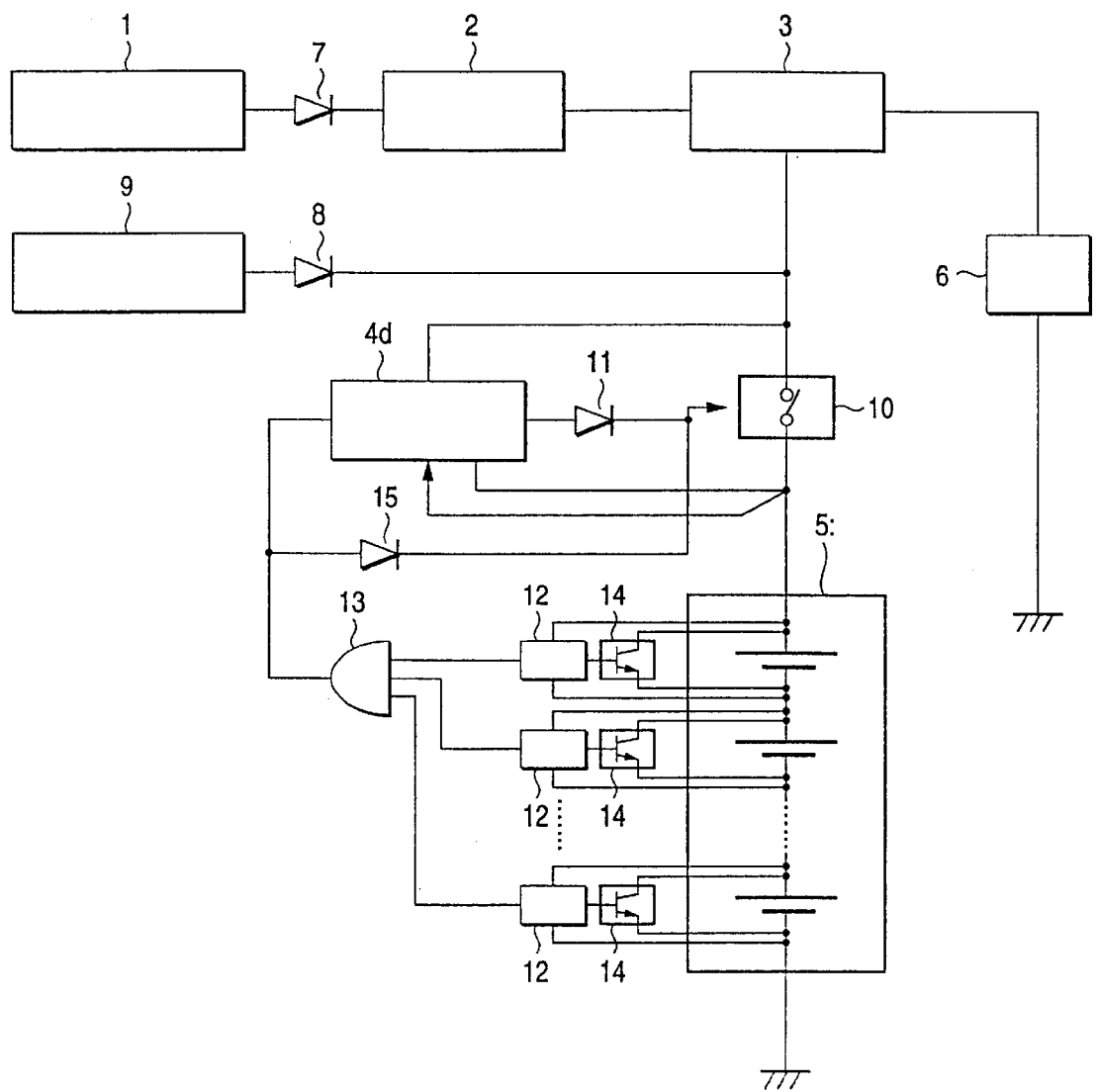
FIG. 5 is a structural view of the low altitude satellite use power supply apparatus showing Embodiment 4 of the present invention.

FIG. 5 is a structural view of the low altitude satellite use power supply apparatus showing Embodiment 4 of the present invention. Embodiment 4 is basically the same as Embodiment 3, however, the different points from Embodiment 3 are as follows: a charge controller 4d is provided having a function in which, after the constant-current charge is shifted to the constant-voltage charge, when the voltage of each battery cell is unbalanced, the constant-voltage charge control is released, and the voltage balance of each battery cell is taken by forcibly charging each battery cell to the voltage by which the shunt circuit 12 is operated (to the shunt voltage) by the charge current I3.

In this connection, the voltage of each battery cell is detected by the cell voltage detector 12 and is input into the charge controller 4d through the OR circuit 13. Existence of the voltage unbalance of each battery cell (voltage fluctuation among battery cells to the predetermined voltage) is detected in the charge controller 4d. However, the voltage of each battery cell is monitored on the ground station side. When the unbalance is generated, a command to release the constant-voltage charge control is generated, and each battery cell is forcibly charged to the voltage, by which the shunt circuit 12 is operated, by the charge current I3.

As described above, in the present invention, after the constant-current charge is shifted to the constant-voltage charge, when the voltage of each battery cell is unbalanced, the constant-voltage charge control is released, and each battery cell is charged to the shunt operation voltage by the charge current I3, thereby, the voltage unbalance of each battery cell generated as the charge cycle advances, can be corrected.

Incidentally, in each embodiment, the low altitude satellite use power supply apparatus is described as an embodiment, however, the present invention can also be applied to other satellites, electric motorcars, ground use solar power generation, etc.

According to the present invention, when a plurality of cascade-connected battery cells are charged (multi-stage charged) by different charge currents, the overcharge of the battery cells can be suppressed.

Further, in the present invention, when the voltage of any battery cell reaches a prescribed value under the condition of the minimum level charge current supply to the storage battery, the charge current flowing to the battery cell is bypassed to the shunt circuit connected to the battery cell, thereby, the overcharge of the battery cell can be suppressed.

In the present invention, the voltage of the overall battery under the condition that the voltage of each battery cell is balanced, is monitored, and when the voltage reaches a prescribed value, the constant-current charge is switched to the constant-voltage charge, thereby, the battery operation can be made ideal condition so that the cycle life deterioration is suppressed.

Furthermore, in the present invention, after the constant-current charge is shifted to the constant-voltage charge, when the voltage of each battery cell is unbalanced, the constant-voltage charge control is released, and each battery cell is charged to the shunt operation voltage, thereby, the voltage unbalance of each battery cell can be corrected.

What is claimed is:

1. A battery accumulating apparatus, comprising:
   a charging solar power supply;
   a storage battery having battery cells which are cascade-connected; and
   a charge current generating means for generating a current to charge the storage battery from the charging solar power supply, wherein the charge current generating means has a means for generating different charge currents; and
   a power supply change means for connecting the charging solar power supply to the storage battery until a prescribed voltage is reached and for connecting the different charge currents to the storage battery until another prescribed voltage is reached.

2. The battery accumulating apparatus according to claim 1, wherein the charge current generating means further comprising a means for changing the charge current so as to be supplied at successively lower levels after, initially, the charge current is supplied at a high level.

3. The battery accumulating apparatus according to claim 2, wherein the charge current generating means has a means for changing the charge current from a high level to successively lower levels when any voltage of the battery cells reaches a prescribed value.

4. The battery accumulating apparatus according to claim 3, further comprising a shunt circuit respectively connected to each battery cell, and when any voltage of the battery cells reaches a prescribed value under the condition of charge current supply to the storage battery, the charge current flowing to the battery cell is bypassed by the shunt circuit connected to the battery cell.

5. The battery accumulating apparatus according to claim 4, wherein a switch, which is provided between the power source and the storage battery; being turned from an ON status to an OFF status by the charge current generating means when any voltage from one of the battery cells reaches a prescribed value; and said switch being returned to ON status at the time of discharge.

6. The battery accumulating apparatus according to claim 2, wherein a switch, which is provided between the power source and the storage battery; being turned from an ON status to an OFF status by the charge current generating means when any voltage from one of the battery cells reaches a prescribed value; and said switch being returned to ON status at the time of discharge.

7. The battery accumulating apparatus according to claim 3, wherein a switch, which is provided between the power source and the storage battery; being turned from an ON status to an OFF status by the charge current generating means when any voltage from one of the battery cells reaches a prescribed value; and said switch being returned to ON status at the time of discharge.

8. The battery accumulating apparatus according to claim 1, further comprising a switch, which is provided between the power source and the storage battery; said switch being turned from an ON status to an OFF status by the charge current generating means when any voltage from one of the battery cells reaches a prescribed value; and said switch being returned to ON status at the time of discharge.

9. The battery accumulating apparatus according to claim 1, wherein the charge current generating means has a means which detects the overall voltage of the battery cells, and which shifts to constant-voltage charge control when the detected voltage reaches a prescribed value.

10. The battery accumulating apparatus according to claim 1, wherein a Li-Ion (lithium ion) battery cell structured with a Li (lithium) electrode is used as the battery cell.

11. A battery accumulating apparatus, comprising:
   a storage battery to which battery cells are cascade-connected; and
   a charge current generating means for generating a current to charge the storage battery from a power supply output;
   wherein the charge current generating means has a means for generating different and a plurality of charge currents, and for supplying different and a plurality of charge currents to the storage battery,
   wherein the charge current generating means has a means which releases the constant-voltage charge control when the voltage of the plurality of battery cells becomes unbalanced, and charges the battery cells with a low level charge current until the voltage of all the battery cells reaches a prescribed value.

* * * * *